United States Patent Office 2,782,223
Patented Feb. 19, 1957

2,782,223

PRODUCTION OF TEREPHTHALATES FROM 2,5-DIACYLOXY-CYCLOHEXANE-1,4-DICARBOXYLATES

Hugh Wilma Boulton Reed, Norton-on-Tees, England, assignor to Imperial Chemical Industries Limited, a corporation of Great Britain No Drawing. Application March 29, 1954,
Serial No. 419,578

Claims priority, application Great Britain May 1, 1953

2 Claims. (Cl. 260—475)

This invention relates to the production of di-esters.

According to the present invention, there is provided a process for the production of dialkyl terephthalates which comprises the steps of decomposing by subjecting to a temperature of 200° to 650° C. a di-ester of a dialkyl cyclohexane-2,5-diol-1,4-dicarboxylate having a structure:

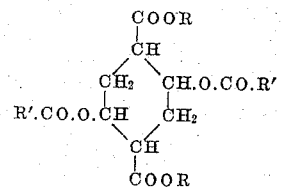

where R and R' are alkyl groups, to give a dialkyl cyclohexa-1,4-diene-1,4-dicarboxylate having a structure:

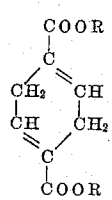

and simultaneously or subsequently dehydrogenating this compound to give a dialkyl terephthalate.

Other products produced by the process of the present invention include hydrogen and the acid R'.COOH. In addition, small amounts of free terephthalic acid and mono-alkyl terephthalate are formed; it is however preferable to operate in a manner such that minor amounts only of free acid and mono-alkyl terephthalate are formed.

The decomposition of a compound having a structure:

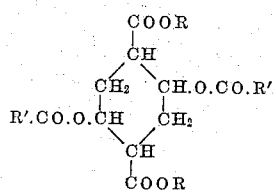

to a diene having a structure:

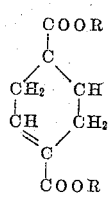

may be carried out by heating alone, or by heating in the presence of an inert contact material, or by passage through an unpacked heated zone.

In this step, for example, the diacetate of dimethyl cyclohexane-2,5-diol-1,4-dicarboxylate may be converted to dimethyl cyclohexa-1,4-diene-1,4-dicarboxylate; at the same time, small amounts of the corresponding free acid and acid ester may be formed.

The dialkyl cyclohexa-1,4 - diene - 1,4 - dicarboxylate formed may be converted in three ways to the corresponding dialkyl terephthalate. These three ways, namely:

(1) thermal dehydrogenation,
(2) catalytic dehydrogenation,
(3) chemical dehydrogenation using an oxidising agent, will now be discussed in turn.

(1) *Thermal dehydrogenation.*—A dialkyl cyclohexa-1,4-diene-1,4-dicarboxylate may be converted to a dialkyl terephthalate by contacting it in the vapour phase with an inert packing material, such as quartz chips, maintained at a temperature of 350° to 650° C., or it may be passed through an unpacked reaction zone maintained at a similar temperature. Alternatively, the dialkyl ester may be dehydrogenated at a temperature of 350° to 650°, by carrying out the reaction in the liquid phase. In order that this reaction may be carried out in the liquid phase, the use of elevated pressure is necessary.

(2) *Catalytic dehydrogenation.*—A dialkyl cyclohexa-1,4-diene-1,4-dicarboxylate may be dehydrogenated by contacting with a dehydrogenation catalyst under suitable conditions.

Catalysts which are suitable include those comprising a metal of group VIII of the periodic system or copper. These metals may be supported on porous materials such as alumina, magnesia, silica or kieselguhr, or may be employed in a finely divided state. Other catalysts which may be employed are the oxides of chromium, molybdenum and vanadium; these oxides may be employed in admixture with, or supported upon, other oxides, such as alumina.

When dimethyl cyclohexa-1,4-diene-1,4-dicarboxylate is used as the starting material, this may be contacted in the liquid or vapour phase with a catalyst as described above maintained at a temperature within the range of 200° to 650° C. The products include terephthalic acid, methyl hydrogen terephthalate and dimethyl terephthalate.

(3) *Chemical dehydrogenation using an oxidising agent.*—A dialkyl cyclohexa-1,4-diene-1,4-dicarboxylate may be oxidised to a dialkyl terephthalate by heating with selenium or sulphur at a temperature of 150° to 300° C.

It is also possible to carry out the dehydrogenation as disclosed in co-pending application No. 419,576, Thompson filed March 29, 1954, where it is stated that a dialkyl cyclohexa-,4-diene-1,4-dicarboxylate may be converted to a dialkyl terephthalate by heating in the presence of a gas containing free oxygen. This reaction, which is preferably effected at a temperature of 150° to 300° C., may be carried out, if desired, in the presence of a catalyst, such as a soluble salt of cobalt, manganese, iron, nickel or copper; cobalt naphthenate is particularly suitable.

It is a special feature of the process of the present invention that a dialkyl cyclohexane-2,5-diol-1,4-dicarboxylate may be decomposed to a diene and dehydrogenated in a single step. For example, the said compound may be contacted with a dehydrogenation catalyst, as hereinbefore defined, at a temperature of 200° C. to 650° C., whereby the elements of a carboxylic acid are removed and hydrogen is eliminated in a single step; similarly, the compound may be contacted with an inert solid material or passed through an unpacked reaction zone at an elevated temperature of 350° to 650° C., in a single step. The latter process may be carried out in the presence of a gas containing free oxygen, which facilitates the dehydrogenation reaction.

In the compound:

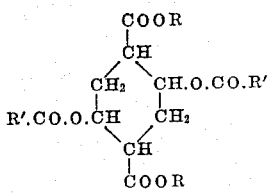

for use in the present invention it is desirable for R and R' to be alkyl groups containing not more than four atoms. In particular, it is preferable to use the diacetate of dimethyl cyclohexane-2,5-diol-1,4-dicarboxylate.

In the process of the present invention, it is to be noted that small amounts of acid esters and di-acids may be formed. For example, when using the diacetate of dimethyl cyclohexane-2,5-diol-1,4-dicarboxylate, the products from the first stage of the process may include, in addition to dimethyl cyclohexa-1,4-diene-1,4-dicarboxylate, methyl hydrogen cyclohexa-1,4-diene-1,4-dicarboxylate and cyclohexa-1,4-diene-1,4-dicarboxylic acid. These compounds will undergo dehydrogenation in the second stage to give methyl hydrogen terephthalate and terephthalic acid respectively. Additional amounts of these compounds may also be formed from dimethyl cyclohexa-1,4-diene-1,4-dicarboxylate in the second stage of the process. However when working under the conditions disclosed above, these by-products are formed in relatively small amounts.

The di-esters of dialkyl cyclohexane-2,5-diol-1,4-dicarboxylates exist in stereoisomeric forms; the different isomers may undergo reaction at different rates, but, in all cases, the final product is a dialkyl terephthalate.

The di-esters of the diol carboxylates for use as starting materials in the process of the present invention may be produced by any suitable means. It is an important feature of the present invention that they may be produced from dialkyl succinates or derivatives thereof.

Thus, a di-alkyl succinate may be treated with a condensing agent. Suitable condensing agents include alkali and alkaline earth metals, and alkoxides of these metals, sodium and sodium alkoxides being particularly suitable. Thus, a di-alkyl succinate ROOC.CH$_2$CH$_2$.COOR may be condensed in the presence of sodium or a sodium alkoxide as described in copending application Serial No. 419,600, filed on even date herewith to give a disodium derivative of a dialkyl cyclohexa-1,4-diene-2,5-diol-1,4-dicarboxylate, which has a structure:

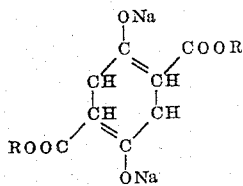

In these condensation reactions, the group R is preferably an alkyl group containing one to four carbon atoms.

From the disodium salts produced in these condensation reactions, it is possible to produce di-esters of dialkyl cyclohexane-2,5-diol-1,4-dicarboxylates by various methods.

The disodium derivative of the dialkyl cyclohexa-1,4-diene-2,5-diol-1,4-dicarboxylate may be hydrolysed by the use of dilute mineral acids, for example, hydrochloric acid, or by the use of organic acids or carbon dioxide to the corresponding dialkyl cyclohexa-1,4-diene-2,5-diol-1,4-dicarboxylate.

The dialkyl cyclohexa-1,4-diene-2,5-diol-1,4-dicarboxylate may then be converted to a dialkyl cyclohexane-2,5-diol-1,4-dicarboxylate by hydrogenation. This hydrogenation may be carried out using a catalyst comprising a metal of group VIII of the periodic system, or copper. The use of elevated temperatures, for example, 50° to 200° C., and elevated pressures is advantageous although with highly active catalysts the reaction may be carried out at room temperature and pressure. If desired, the dialkyl cyclohexa-1,4-diene-2,5-diol-1,4-dicarboxylate may be dissolved in a suitable solvent, such as the alcohol corresponding to the ester group. Thus, if diethyl succinate is used as the starting material, ethyl alcohol is a convenient solvent for the hydrogenation of the diethyl cyclohexa-1,4-diene-2,5-diol-1,4-dicarboxylate.

The dialkyl cyclohexane-2,5-diol-1,4-dicarboxylate may then be converted to a di-ester of the dialkyl cyclohexane-2,5-diol-1,4-dicarboxylate by reacting with an acylating agent, such as, for example; acetyl chloride in the presence of an inorganic base such as sodium hydroxide or an organic base, such as pyridine; acetic anhydride; a carboxylic acid and a dehydrating agent, such as hydrogen chloride; ketene or isopropenyl acetate.

As an alternative, the disodium salt of the dialkyl cyclohexa-1,4-diene-2,5-diol-1,4-dicarboxylate may be reacted with an acid chloride, such as acetyl chloride, to give a di-ester of the dialkyl cyclohexa-1,4-diene-2,5-diol-1,4-dicarboxylate. The product may be converted to a di-ester of the dialkyl cyclohexane-2,5-diol-1,4-dicarboxylate by hydrogenation in the presence of a catalyst, such as, for example, one containing a metal selected from copper, nickel, cobalt, iron, platinum or palladium.

EXAMPLE 1

24.7 grams of dimethyl-2,5-diacetoxy-cyclohexane-1,4-dicarboxylate in 50 mls. of toluene were fed over a period of one hour through a converter, 33 inches long and 1.25" in diameter, containing quartz chips maintained at a temperature of 400° C. Nitrogen was passed through the system at a rate of 10 litres/hour. The products were condensed and separated by filtration. 6.4 grams of dimethyl cyclohexa-1,4-diene-1,4-dicarboxylate were obtained. The yield of this compound was 42%.

A solution of this dimethyl cyclohexa-1,4-diene-1,4-dicarboxylate in toluene (30% by weight), was passed over glass beads maintained at a temperature of 500° C., in an atmosphere of nitrogen. The space velocity of the dicarboxylate was 0.10 litres per hour per litre of reaction space. A 99.8% yield of dimethyl terephthalate was obtained.

EXAMPLE 2

26.6 grams of dimethyl-2,5-diacetoxy-cyclohexane-1,4-dicarboxylate in solution in 80 grams of toluene were fed over one hour into a converter containing quartz chips, maintained at 500° C. Nitrogen was passed through the system at a rate of 10 litres per hour. The products were condensed, filtered and crystallised from methanol. 4.0 grams of dimethyl terephthalate were obtained, this corresponding to a yield of 25%.

EXAMPLE 3

4 grams of the di-acetate of dimethyl cyclohexane-2,5-diol-1,4-dicarboxylate and 0.5 gram of a catalyst comprising 30% by weight of palladium supported on charcoal were heated together at 300° C. for two hours. The residue, on cooling, was extracted with methanol and dimethyl terephthalate isolated from the methanol solution by crystallisation. 1.5 grams of dimethyl terephthalate were obtained, corresponding to a yield of 62%.

I claim:

1. A process for the production of a lower dialkyl terephthalate comprising the steps of decomposing by subjecting to a temperature of 200° to 650° C., a di-ester of a dialkyl cyclohexane-2,5-diol-1,4-dicarboxylate, having the formula:

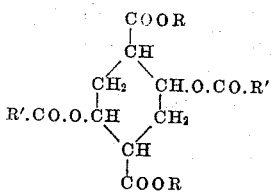

wherein R and R' are lower alkyl groups, to obtain a lower dialkyl cyclohexa-1,4-diene-1,4-dicarboxylate and thermally dehydrogenating said cyclohexa-1,4-diene-1,4-dicarboxylate by heating the same at a temperature of 350° to 650° C.

2. The process of claim 1 wherein said decomposition and dehydrogenation are carried out in a single stage by heating said diester at 350 to 650° C., the resulting diene being substantially simultaneously converted to said terephthalate.

References Cited in the file of this patent

FOREIGN PATENTS 738,922    Germany _____ Sept. 21, 1943

OTHER REFERENCES

Hickinbottom: "Reactions of Organic Compounds," pp. 3, 6 to 9 and 109 (1948).

Richter: "Textbook of Organic Chemistry," p. 326, J. Wiley, 1952.